(12) United States Patent
Pacheco et al.

(10) Patent No.: US 10,638,117 B2
(45) Date of Patent: Apr. 28, 2020

(54) METHOD AND APPARATUS FOR GROSS-LEVEL USER AND INPUT DETECTION USING SIMILAR OR DISSIMILAR CAMERA PAIR

(71) Applicant: Dell Products, LP, Round Rock, TX (US)

(72) Inventors: Roman Joel Pacheco, Leander, TX (US); Thomas Lanzoni, Cedar Park, TX (US); Deeder M. Aurongzeb, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 16/009,168

(22) Filed: Jun. 14, 2018

(65) Prior Publication Data

US 2018/0302609 A1     Oct. 18, 2018

Related U.S. Application Data

(63) Continuation of application No. 14/950,706, filed on Nov. 24, 2015, now Pat. No. 10,021,371.

(51) Int. Cl.
*H04N 13/25* (2018.01)
*H04N 13/246* (2018.01)
(Continued)

(52) U.S. Cl.
CPC ......... *H04N 13/25* (2018.05); *G06K 9/00201* (2013.01); *G06K 9/00355* (2013.01);
(Continued)

(58) Field of Classification Search
CPC ............ G06K 9/00201; G06K 9/00355; G06T 2207/10024; G06T 2207/10028;
(Continued)

(56) References Cited

U.S. PATENT DOCUMENTS 5,065,236 A   11/1991   Diner
5,135,308 A   8/1992   Kuchel
(Continued)

FOREIGN PATENT DOCUMENTS

EP   2 590 418 A1   5/2013
EP   2 779 091 B1   8/2015

OTHER PUBLICATIONS

Caron et al. "Hybrid stereoscopic calibration," SPIE Newsroom, DOI: 10.1117/2.1201106.003738, Jun. 28, 2011, pp. 1-3 http://spie.org/x48817.xml?pf=true.
(Continued)

*Primary Examiner* — Nirav G Patel
(74) *Attorney, Agent, or Firm* — ProI Intellectual Property Law, P.L.L.C.; H. Kenneth ProI

(57) ABSTRACT

An information handling system includes a RGB digital camera and a secondary digital camera that can be any type of two-dimensional or three-dimensional digital camera known in the art and a processor. The processor executes code instructions of a gross-level input detection system to detect objects in images taken contemporaneously by the RGB digital camera and the secondary digital camera using object detection techniques, and to calculate the positions of regions of interest within those objects. Further, the processor executes code instructions to detect the orientation of regions of interest within identified objects, and to associate those orientations, changes in orientations, or movement of regions of interest with user commands.

20 Claims, 11 Drawing Sheets

(51) Int. Cl.
*G06K 9/00* (2006.01)
*G06T 7/285* (2017.01)
*H04N 13/243* (2018.01)
*H04N 13/221* (2018.01)
*H04N 13/239* (2018.01)
*H04N 13/00* (2018.01)

(52) U.S. Cl.
CPC .......... *G06T 7/285* (2017.01); *H04N 13/221* (2018.05); *H04N 13/239* (2018.05); *H04N 13/243* (2018.05); *H04N 13/246* (2018.05); *G06T 2207/10024* (2013.01); *G06T 2207/10028* (2013.01); *G06T 2207/10048* (2013.01); *G06T 2207/30196* (2013.01); *H04N 2013/0081* (2013.01)

(58) Field of Classification Search
CPC . G06T 2207/10048; G06T 2207/30196; G06T 7/285; H04N 13/221; H04N 13/239; H04N 13/243; H04N 13/246; H04N 13/25; H04N 2013/0081
See application file for complete search history.

(56) References Cited

U.S. PATENT DOCUMENTS

| | | | |
|---|---|---|---|
| 6,441,817 B1 | 8/2002 | Gossweiler, III et al. | |
| 7,535,002 B2 | 5/2009 | Johnson et al. | |
| 7,994,480 B2 | 8/2011 | Johnson et al. | |
| 8,007,110 B2 | 8/2011 | Dunn et al. | |
| 8,035,688 B2 | 10/2011 | Snyderman et al. | |
| 8,098,276 B2 | 1/2012 | Chang et al. | |
| 8,265,425 B2 | 9/2012 | Ng-Thow-Hing et al. | |
| 8,280,107 B2 | 10/2012 | Kmiecik et al. | |
| 8,290,358 B1 | 10/2012 | Georgiev | |
| 8,300,089 B2 | 10/2012 | Robinson | |
| 8,446,470 B2 | 5/2013 | Lu et al. | |
| 8,514,225 B2 | 8/2013 | Genova | |
| 8,619,082 B1 | 12/2013 | Ciuera et al. | |
| 8,854,431 B2 | 10/2014 | Song et al. | |
| 8,866,889 B2 | 10/2014 | Masalkar et al. | |
| 8,947,534 B2 | 2/2015 | Dunn et al. | |
| 2002/0031253 A1 | 3/2002 | Dialameh et al. | |
| 2006/0072788 A1 | 4/2006 | Suzuki | |
| 2010/0235129 A1 | 9/2010 | Sharma et al. | |
| 2011/0176108 A1 | 7/2011 | Nakagawa et al. | |
| 2012/0056982 A1 | 3/2012 | Katz et al. | |
| 2012/0218391 A1 | 8/2012 | Baker | |
| 2012/0257018 A1 | 10/2012 | Shigemura et al. | |
| 2013/0050437 A1 | 2/2013 | Robinson | |
| 2013/0107010 A1* | 5/2013 | Hoiem | G06K 9/46 348/47 |
| 2013/0182083 A1 | 7/2013 | Grossmann | |
| 2013/0250053 A1 | 9/2013 | Levy | |
| 2014/0094307 A1 | 4/2014 | Doolittle et al. | |
| 2014/0111623 A1 | 4/2014 | Zhao et al. | |
| 2014/0240469 A1 | 8/2014 | Lee | |
| 2014/0307058 A1 | 10/2014 | Kirk et al. | |
| 2016/0253802 A1* | 9/2016 | Venetianer | H04N 7/18 382/128 |

OTHER PUBLICATIONS

Eynard et al, "UAV Motion Estimation using Hybrid Stereoscopic Vision," MVA2011 IAPR Conference on Machine Vision Applications, Jun. 13-15, 2011, Nara, Japan, pp. 340-343 http://www.mva-org.jp/Proceedings/2011CD/papers/09-28.pdf.

Tomasi—Bilateral Filtering for Gray and Color Images, Proceedings of the 1998 IEEE International Conference on Computer Vision, Bombay, India, 8 pgs, https://users.soe.ucscedu/~manduchi/Papers/ICCV98.pdf.

LinX Imaging Takes Mobile Photography to a New Dimension, Aiming to Put SLR Image Quality in Our Pockets, LinX Computational Imaging, Ltd., Jun. 5, 2014, 4 pgs., http://www.businesswire.com/news/home/20140605005713/en/LinX-Imaging-Takes-Mobile-Photography-Dimension-Aiming.

Nickel, Kai, and Rainer Stiefelhagen. "Visual recognition of pointing gestures for human-robot interaction." Image and Vision Computing 25.12 (2007): 1875-1884.

Silberman, Nathan, and Rob Fergus. "Indoor scene segmentation using a structured light sensor." Computer Vision Workshops (ICCV Workshops), 2011 IEEE International Conference on. IEEE, 2011.

* cited by examiner

METHOD AND APPARATUS FOR GROSS-LEVEL USER AND INPUT DETECTION USING SIMILAR OR DISSIMILAR CAMERA PAIR

This application is a continuation of prior application Ser. No. 14/950,706, entitled "Method and Apparatus for Gross-Level User and Input Detection Using Similar or Dissimilar Camera Pair," filed on Nov. 24, 2015, which is assigned to the current assignee hereof and is incorporated herein by reference in its entirety.

CROSS REFERENCE TO RELATED APPLICATIONS

Related subject matter is contained in co-pending U.S. patent application Ser. No. 14/880,842 entitled "Method and apparatus for Depth Algorithm Adjustment to Images based on Predictive Analytics and Sensor Feedback in an Information Handling System," filed on Oct. 12, 2015 and U.S. patent application Ser. No. 14/815,614 entitled "Method and Apparatus for Compensating for Camera Error in a Multi-Camera Stereo Camera System," filed on Jul. 31, 2015, the disclosures of which are hereby incorporated by reference.

FIELD OF THE DISCLOSURE

The present disclosure generally relates to a system and method for gross-level input detection based on images captured from two or more digital cameras. The digital cameras may make up a similar pair or a dissimilar pair.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination of the two.

Information handling systems, such as tablet computers, can include a camera or multiple cameras to capture images, which in turn can be stored within the information handling system. The camera can be a digital camera that can include metadata associated with the image, and the metadata can include different information about the image.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

Figure 1:
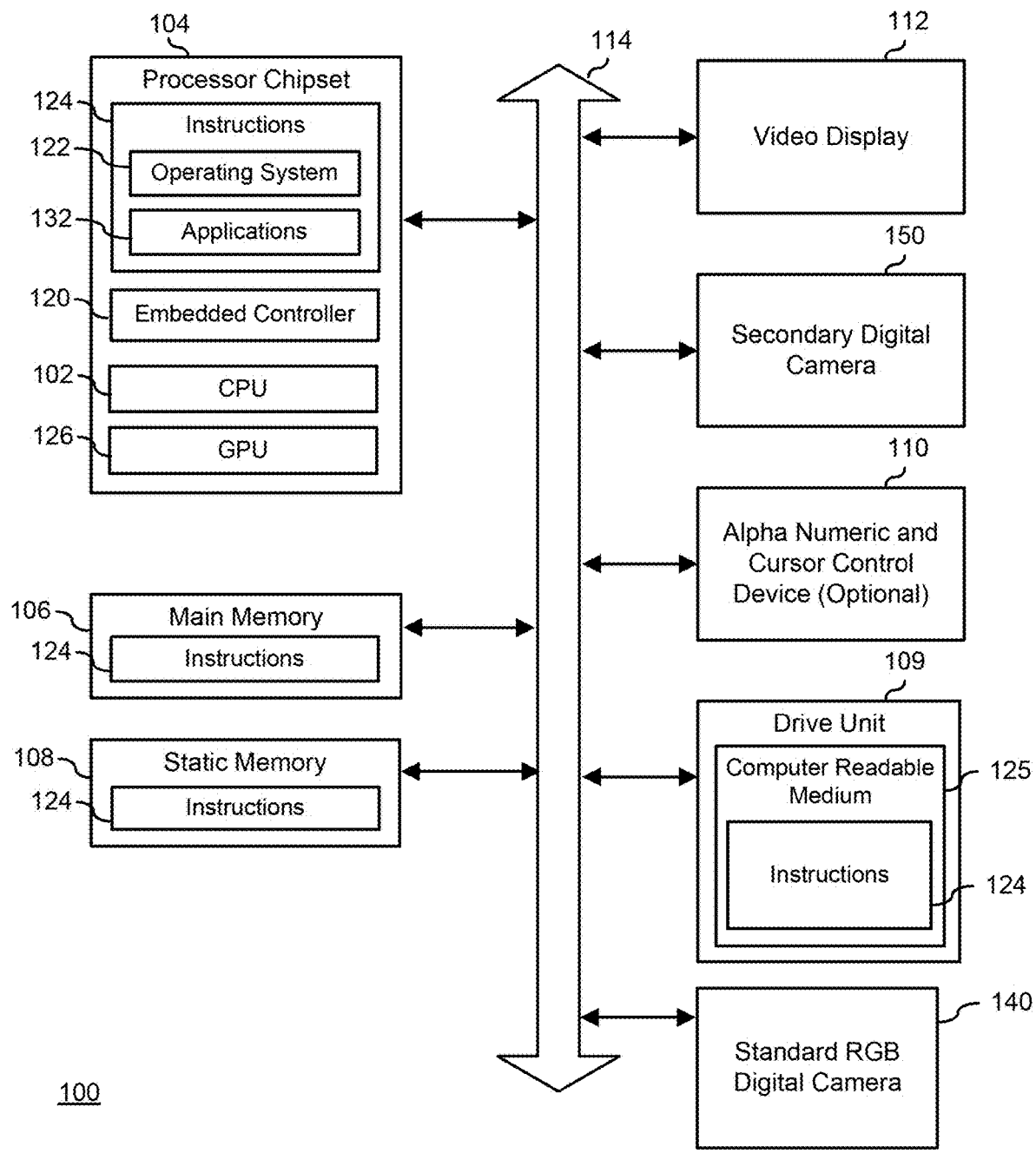
FIG. 1 is a block diagram of an information handling system according to a particular embodiment of the disclosure.

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings may be utilized in this application, as well as in other applications and with several different types of architectures such as distributed computing architectures, client or server architectures, or middleware server architectures and associated components.

For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components. The information handling system may be described in the general context of computer system executable instructions, such as program modules, being executed by a computer system (described for example, below).

The information handling system may typically include a variety of computer system readable media. Such media could be chosen from any available media that is accessible by the information handling system, including non-transitory, volatile and non-volatile media, removable and non-removable media. The main memory 106, the static memory 108, and the drive unit 109 could include one or more computer system readable media 125 in the form of volatile memory, such as a random access memory (RAM) and/or a cache memory. By way of example only, a storage system can be provided for reading from and writing to a non-removable, non-volatile magnetic media device typically called a "hard drive" or drive unit 109. The main memory 106, static memory 108, or computer readable medium 125 may include at least one set of instructions 124 having a set (e.g. at least one) of program modules (not shown) that are configured to carry out the function of embodiments. The instructions 124 having a set (at least one) of program modules may be stored in the main memory 106, static memory 108, and/or drive unit 109 by way of example, and not limitation, as well as an operating system, one or more application programs, other program modules, and program data. Each of the instructions 124, operating system, one or more application programs, other program modules, and program data or some combination thereof, may include an implementation of a networking environment. The program modules generally carry out the functions and/or methodologies of embodiments as described herein.

As will be appreciated by one skilled in the art, aspects of the disclosed invention may be embodied as a system, method, or process, or computer program product. Accordingly, aspects of the disclosed invention may take the form of an entirely hardware embodiment, an entirely software embodiment (including firmware, resident software, microcode, etc.) or an embodiment combining software and hardware aspects that may all generally be referred to herein as a "circuit," "module," or "system." Furthermore, aspects of the disclosed embodiments may take the form of a computer program product embodied in one or more computer readable media having computer readable program code embodied thereon.

Any combination of one or more computer readable media (for example, main memory 106, static memory 108, or computer readable medium 125) may be utilized. In the context of this disclosure, a computer readable storage medium may be any tangible or non-transitory medium that can contain, or store a program (for example, the instructions 124) for use by or in connection with an instruction execution system, apparatus, or device. A computer readable storage medium may be, for example, but not limited to, an electronic, magnetic, optical, electromagnetic, infrared, semiconductor, organic, or quantum system, apparatus, or device, or any suitable combination of the foregoing.

Aspects of the disclosed embodiments are described below with reference to flow diagrams and/or block diagrams of methods, apparatus (systems) and computer program products. It will be understood that each block of the flow diagrams and/or block diagrams, and combinations of blocks in the flow diagrams and/or block diagrams, can be implemented by computer program instructions 124. The computer program instructions 124 may be provided to the processor chipset 104 of a general purpose computer, special purpose computer, or other programmable data processing apparatus to produce a machine, such that the instructions 124, which execute via the processor chipset 104 of the computer or other programmable data processing apparatus, create means for implementing the functions/acts specified in the flow diagrams and/or block diagram block or blocks.

The information handling system can include at least one two-dimensional RGB camera in combination with one or more two-dimensional digital cameras to capture images in the information handling system, such as a RGB camera, an infrared digital camera, a telephoto lens digital camera, a fish-eye digital camera, a wide-angle digital camera, a close-focus digital camera, an array camera such as a CMOS array camera or an array camera composed of other light sensors, or any other type of two-dimensional digital camera. Several presently disclosed embodiments allow for the use of lower cost heterogeneous camera systems that may be part of an information handling system. Use of the integrated heterogeneous camera systems for gross-level 3D input may be more cost effective in an information handling system as compared to a three-dimensional (3-D) camera, e.g., a stereo triangulation camera, a sheet of light triangulation camera, a structured light camera, a time-of-flight camera, an interferometry camera, a coded aperture camera, or any other type of 3-D camera known in the art. Additionally, the embodiments disclosed for gross level detection herein may require lower computational and memory resources in certain embodiments described herein as compared with techniques of disparity and depth determinations on a pixel by pixel basis as with alternate three-dimensional (3-D) camera systems. That is not to say that the gross-level 3D detection of objects and gross level 3D input utilizing lower computing resources of the presently described embodiments could not be used with dual image sensing 3D cameras as an alternative to determination of disparity maps and pixel by pixel depth determinations more often used with 3-D cameras. The present disclosure contemplates use of embodiments herein with 3-D camera systems in some embodiments as well.

When a computer can recognize, detect, or track objects near it in three dimensions with a camera or cameras, it can associate the location, orientation, or movement of those objects with user commands. As an initial matter, the gross-level 3D object detection must detect objects that are or contain regions of interest within the captured images. A base image from one of the camera systems is used as a start to apply object recognition. It is understood that any number of techniques can be used to detect objects in these embodiments. One such technique is sparse coding. Object detection can be performed using techniques other than sparse coding. For example, eigenface techniques (Sirovich and Kirby, "Low-dimensional procedure for the characterization of human faces," Journal of the Optical Society of America A 4 (3): 519-524, 1987), color segmentation, hand detection (Kolsch and Turk, "Robust Hand Detection," Proceedings of the IEEE Int'l Conference on Automatic Face and Gesture Recognition: 614-619, 2004) and other object recognition techniques may be used to determine objects within the captured image or images. For example, eigenfaces may be used to recognize and detect a face within one or both images captured by the system. In another example, hand object recognition may similarly apply to recognize a hand within one or more of the images. Other techniques may involve the use of dictionaries of known objects. Given a dictionary of known objects, a computer compares specific attributes of captured image to the specific attributes of known objects in its dictionary to determine a match, and thereby identify the object in the captured image. This comparison can be achieved using many techniques. For example, a computer could compare every attribute of the captured image to every attribute of every known object, one by one. However, this process would be extremely time and resource consuming. Using sparse coding to complete this comparison task significantly lowers the time and resources expended identifying objects of interest. Generally speaking, sparse coding only tries to match a few of the attributes from the captured image to a few of the attributes of an object in the dictionary.

Calculating the three dimensional position of any pixel in an image can be done using three-dimensional cameras that create dense depth maps. These systems use significant amounts of computer power and time to map every pixel given in an image into a three dimensional map. These systems also require the images be captured by similar digital cameras or non-similar cameras that have been integrated together into a separately functioning three-dimensional camera or a camera array specific to 3D camera system operation. Moreover, an added 3D camera system including calibrated and a mounted plurality of cameras or a composite camera array in an information handling system may be an added cost to the information handling system compared to use of camera systems already on-board such as an RGB camera and an IR camera that may already be mounted for other functions. The embodiments described herein allow for object detection and object distance calculations for objects captured in images taken by two or more dissimilar or heterogeneous cameras, such as, for example, a standard RGB camera, an infra-red camera, a fish-eye camera or other dissimilar camera types. Further, mapping only the locations of a few objects as regions of interest, or regions of interest within those objects significantly lowers the amount of resources used in calculating the location, orientation, and movement of objects. The information handling system and methods used therein as described below improve upon the prior art by incorporating both of these time and resource saving concepts together to recognize, track, and calculate the distance of objects near a computer. Motion tracking algorithms may be applied as well to track motion of objects such as faces or hands recognized according to the above. For example, algorithms for hand tracking may include particle filtering algorithms, computer applied means shift algorithm (camshift), conditional density propagation algorithm (condensation) or icondensation may apply to sequences of images. The system and methods used herein may also associate those objects' locations, movements, and orientations with user commands based on gross-level determinations of distance upon object recognition within the image or images captured. With the gross-level object or region of interest detection and object distance estimation, gross level 3D input commands may be interpreted by some embodiments based on image location or shape, or based on tracked movement of the detected gross-level object in 3D space. As emphasized, the gross-level object determination and distance estimation may be applied to images from dissimilar camera systems in example embodiments. For clarity, a region of interest may be an entire object, such as a hand or face, detected in one or more images and used with the embodiments of the present disclosure or may be part of an object such as a finger or thumb of a hand. Region of interest as used herein will encompass both a detected object and portions of an object.

FIG. 1 shows an information handling system 100 including conventional information handling systems components of a type typically found in client/server computing environments. The information handling system 100 may include memory, one or more processing resources such as a central processing unit (CPU) 102 and related chipset(s) 104 or hardware or software control logic. Additional components of system 100 may include main memory 106, one or more storage devices such as static memory 108 or disk drive unit 109, an optional alpha numeric and cursor control device 110 such as a keyboard, a mouse, or a video display 112. The information handling system 100 may also include one or more buses 114 operable to transmit communications between the various hardware components.

System 100 may include a several sets of instructions 124 to be run by CPU 102 and any embedded controllers 120 on system 100. The instructions 124 can be stored in a computer readable medium 125 of a drive unit 109. One such set of instructions includes an operating system 122 with operating system interface. Example operating systems can include those used with typical mobile computing devices such as Windows Phone mobile OS from Microsoft Corporation and Android OS from Google Inc., for example Key Lime Pie v. 5.x. Additional sets of instructions in the form of multiple software applications 132 may be run by system 100. These software applications 132 may enable multiple uses of the gross level user input detection information handling system as set forth below in more detail.

System 100 includes a video display 112. The video display 112 has a display driver operated by one or more graphics processing units (GPUs) 126 such as those that are part of the chipset 104. The video display 112 also has an associated touch controller 128 to accept touch input on the touch interface of the display screen.

The video display 112 may also be controlled by the embedded controller 120 of chipset 104. Each GPU 126 and display driver is responsible for rendering graphics such as software application windows and virtual tools such as virtual keyboards on the video display 112. In an embodiment the power to the video display 112 is controlled by an embedded controller 120 in the processor chipset(s) which manages a battery management unit (BMU) as part of a power management unit (PMU) in the BIOS/firmware of the main CPU processor chipset(s). These controls form a part of the power operating system. The PMU (and BMU) control power provision to the display screen and other components of the dual display information handling system.

System 100 of the current embodiment has an RGB digital camera 140 and at least one secondary digital camera 150 to capture images in the information handling system 100. In an embodiment, the secondary digital camera 150 may be a RGB digital camera, an infrared digital camera, a telephoto lens digital camera, a fish-eye digital camera, a wide-angle digital camera, a close-focus digital camera, or any other type of two-dimensional digital camera. In another aspect of the embodiment, the GPU 126, or other processor of the information handling system 100, may communicate with the RGB digital camera 140 and the secondary digital camera 150 to receive the captured images and to calculate the distances for certain pixels in the captured images. The images and associated metadata may be stored in a memory of the information handling system 100, such as a flash memory, the static memory 108, the main memory 106, or the like.

Figure 2:
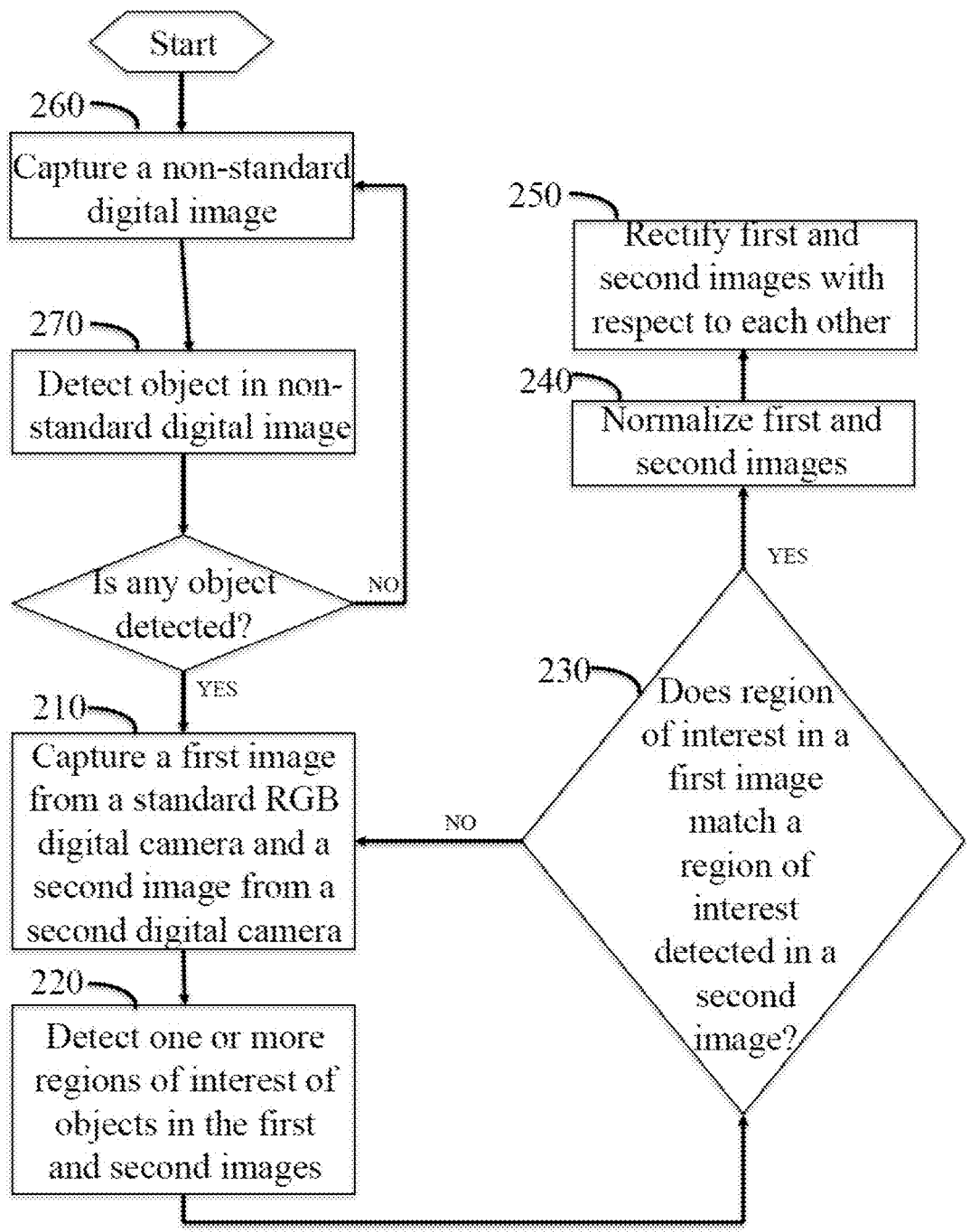
FIG. 2 is a flow diagram of a method for identifying regions of interest within an identified object captured in two separate images according to a particular embodiment of the disclosure.

FIG. 2 shows a flow diagram of a method for identifying objects or regions of interest within an identified object captured in two separate images. For example, in one embodiment the system or method may identify an object as a region of interest, such as an Eigenface region, and this object may serve as the region of interest to be identified in both captured images of a scene. In an embodiment, at block 210, the information handling system may capture a first image from a RGB digital camera and a second image from a second digital camera. The first and second images are captured contemporaneously. The RGB camera and the second digital camera may be located at different angles and orientation from one another. The information handling system also detects one or more regions of interest within objects in those first and second images.

Figure 3:
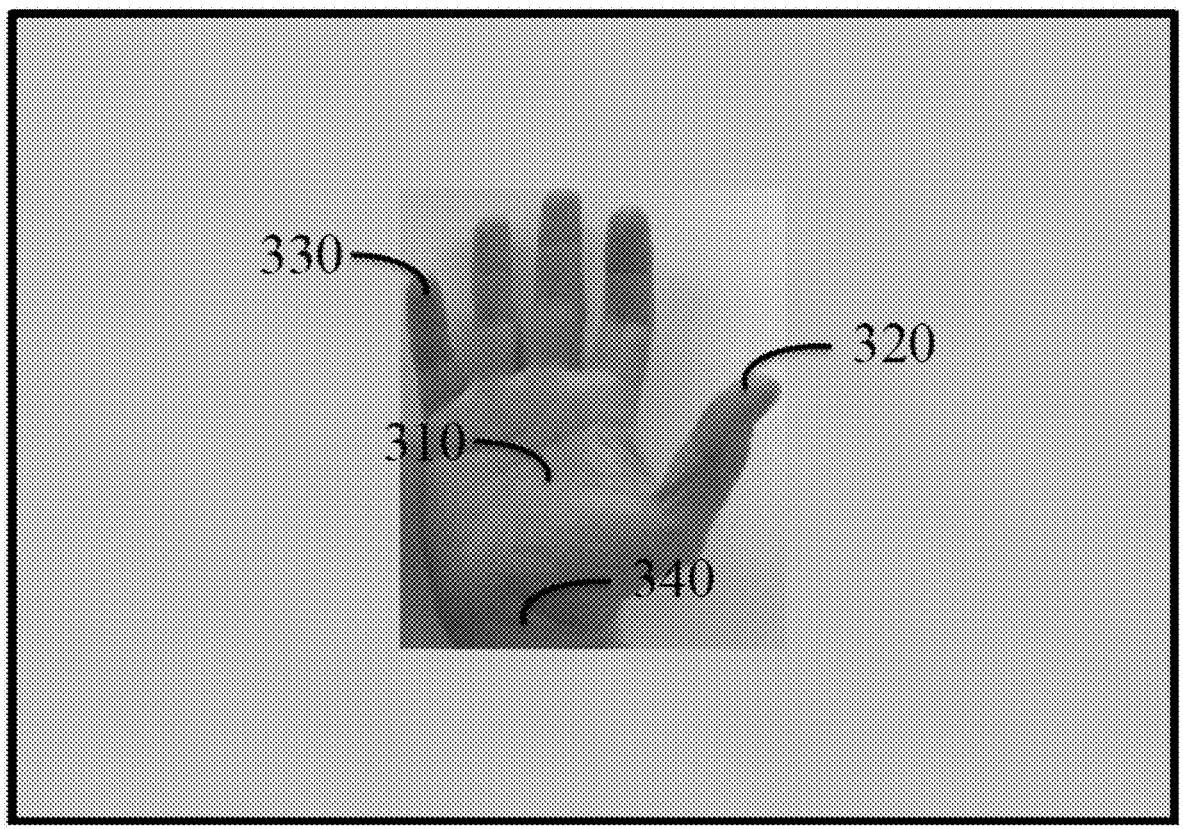
FIG. 3 is a diagram of objects within images and regions of interest located within those objects according to a particular embodiment of the disclosure.
Figure 4:
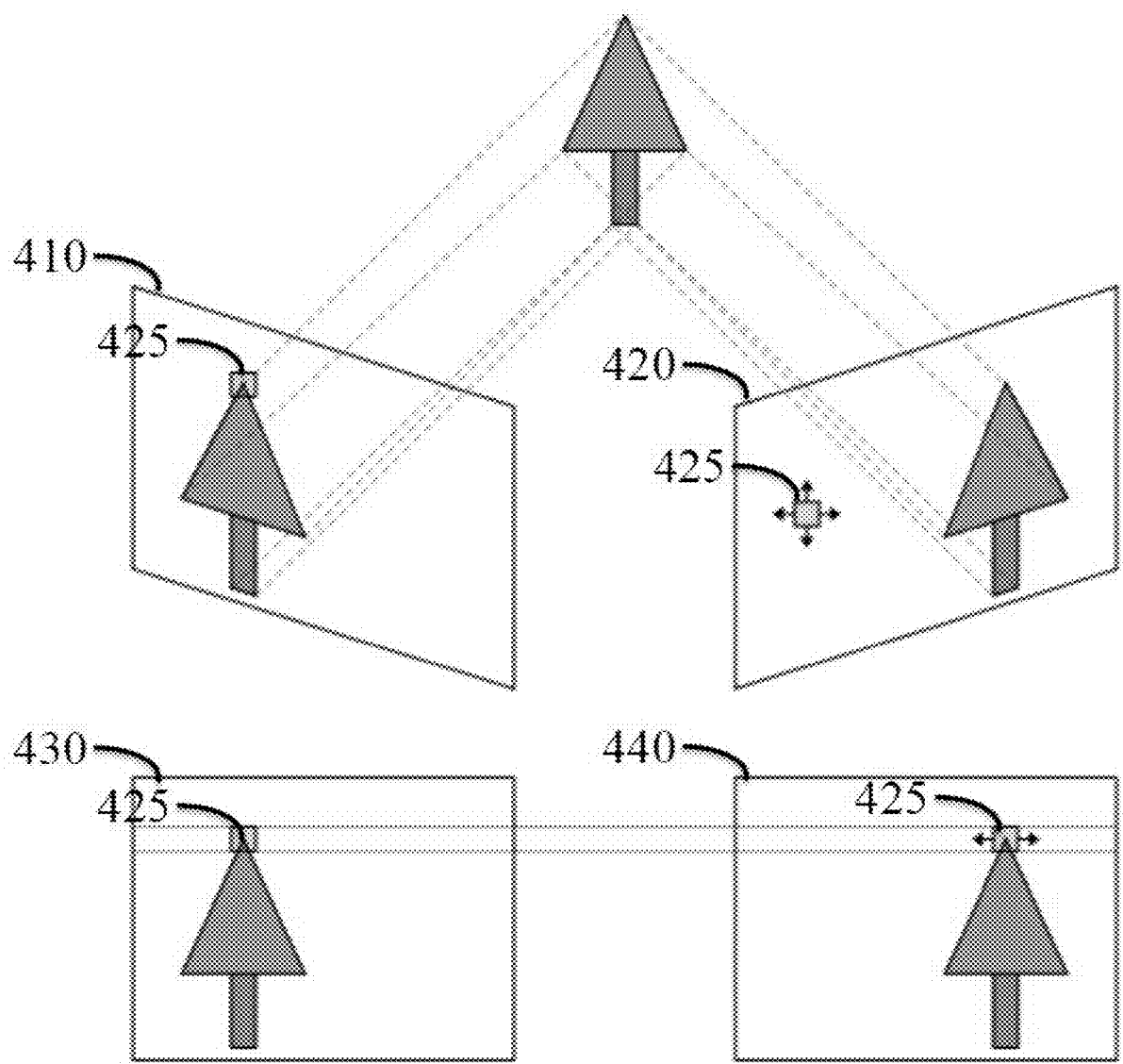
FIG. 4 is a diagram illustrating a rectification method according to a particular embodiment of the disclosure.

FIG. 3 shows an example of an object within an image and regions of interest located within those objects. As shown in FIG. 3, in an embodiment, an example of an object within an image could be a hand 310 that serves as the region of interest. In another embodiment, the region of interest may be the object, for example the hand 310, but with different configurations and shapes (not shown). For example, hand 310 may be open handed as shown, or may be in a fist, or may appear with one or more fingers extended, or may be oriented differently before the image sensors and each may provide a different object recognized shape and serve as a region of interest. In yet other embodiments, the regions of interest within the object 310 could be the fingertips 320 and 330, and wrist 340.

Referring back to FIG. 2, at block 220, the information handling system may detect one or more regions of interest as separate objects or regions within objects in the first and second images using any number of object detection techniques. One such technique is called "sparse coding." Generally speaking, sparse coding uses mathematical optimization algorithms to roughly detect elements of an object in an image and correlate those elements with objects in a dictionary of known object images, as discussed in the paper entitled "Sparse Coding for Object Recognition," written by Stefan Lee and dated Sep. 2, 2013, incorporated herein by reference. Sparse coding only tries to match a few of the attributes from a captured image to a few of the attributes of an object in a dictionary of known objects. The goal of sparse coding is to use mathematical optimization techniques to produce the fewest attributes in a dictionary of known objects (given in linear coefficients of dictionary columns where the dictionary is in matrix form) that best reconstruct the attributes of the captured image (given as an input signal in the form of a vector). Sparse coding has been applied to high and low level vision tasks, including face recognition, image classification, image denoising and inpainting and anomaly detection in video. The end product of this method is the identification of objects or regions of interest within those object.

Referring back to FIG. 2, as shown in box 220, in an embodiment, an information handling system detects one or more regions of interest that are objects in the images or regions of interest within the objects in the first and second images using sparse coding. For example, the method or system described in the paper "Sparse Coding for Object Recognition," or similar methods of identifying and locating objects or regions of interest within an object in a digital image may be used. In an embodiment, if the regions of interest identified by the information handling system in the first image do not match or correlate with regions of interest in the second image, the information handling system repeats step 210. A region of interest may be defined into a "superpixel" or region of pixels in one or both images associated with the recognized object. For example, an Eigenface may occupy a rectangle of a fixed number of pixels depending on closeness of the face to the image sensors. At a medium distance from the camera sensors, in an example embodiment, an eigenface super pixel may occupy a 40 pixel by 40 pixel square as the recognized region of interest. Depending on the proximity of the face to the cameras, the region of interest superpixel may be a pixel region with dimensions from below tens of pixels up to hundreds of pixels. Moreover, the resolution of the cameras may determine the pixel dimensions of the region of interest superpixel as well. It is understood, that object recognition may determine any superpixel size for a region of interest in the object recognition. Additionally, any polygon or other shape may be assigned to a region of interest superpixel. In another example embodiment, a hand at a medium distance from the camera sensors may be a rectangle of 28 pixels by 30 pixels in another example embodiment.

However, if the information handling system succeeds in identifying a region of interest in the first image, such as an object, which matches a region of interest in the second image, the information handling system may normalize or correlate the object in coordinate space between the first and second images, as shown in block 230. This normalization or correlation may be less rigorous than normalization that occurs with 3D image processing with a 3D camera system. The normalization allows the information handling system to account for differences between the two cameras' capture distances, fields of view, or number of pixels in each image. The correlation may be within coordinate space to accommodate the differences between heterogeneous cameras used to capture the images. A normalization factor may be applied to relate the spatial coordinates between two heterogeneous camera types. For example, if the two image sensors for the camera systems are at different x-y coordinate locations, spatial normalization with respect to identifying common x levels and y levels in the captured images may occur to accomplish comparison of regions of interests or objects between images from two image sensors.

Additionally, aspects such as field of view or depth distance may need to be trimmed to accommodate differences between heterogeneous camera types. This trimming of the image aspect, such as field of view or depth range, may be applied to a camera system with increase capability to normalize or otherwise correlate the images captured with those captured with the camera having more limited capabilities. For example, a fish-eye camera may have a very wide field of view that must be trimmed to a reasonable level to correlate a field of view with another camera being used to capture images according to the present disclosures. In another example, an IR camera may be used as one of the camera image sensors. An IR camera has limited distance range of image capture due to illumination and other factors. As a result, an IR camera system will require a trimmed depth range for the other camera system for with the methods of the present disclosure in some embodiments.

In an embodiment, at block 230, the first and second images are further normalized in order to uniform spatial coordinates for sets of visual data between the two images. For example, if one camera produces images with 640 horizontal pixels, but the second camera produces images with 1920 horizontal pixels, the location of any specific set of pixels (describing an object) must be normalized to one general scale. One way to normalize these pixel locations across disparate horizontal pixel dimensions is to describe the position of the detected object on a scale of zero to one, where the unit one in the horizontal axis of any given image is equivalent to the number of horizontal pixels in that image, and the unit one in the vertical axis is equivalent to the number of vertical pixels in that image. Thus, an object located 64 pixels horizontally away from the origin in an image with 640 horizontal pixels would have a horizontal position of 0.1, but an objected located 192 pixels horizontally away from the origin in an image with 1920 horizontal pixels would similarly have a horizontal position of 0.1. One skilled in the art shall recognize that there are a number of methods that may be employed to normalize the images.

Returning to FIG. 2, at block 240 the information handling system in an embodiment may calculate three-dimensional positions of an object and regions of interest of an object located in the first and second images captured at block 210. The different angles of view between the first and second images can cause a shift (parallax) in the (X,Y,Z) coordinates for each pixel in the image. It should be understood that all (X, Y, Z) coordinates in this step are normalized, as described above, to have measurements between zero and one. For example, referring back to FIG. 3, the region of interest associated with the hand, located at point 310 can have coordinates of $(X_1,Y_1,Z_1)$ when captured in the first image, and can have the coordinates of $(X_2,Y_2,Z_2)$ when captured in the second image. The difference, or parallax, between the coordinates from each of the apertures can be utilized to determine an absolute distance that the hand 310 is from each of the cameras, in physical units. The calculation of the distance can be based on a calibration file that models the relationship(s) of the cameras, stored in a memory of the information handling system 100.

In another embodiment, images are normalized in the horizontal and vertical, a test image may be used to assess a determination of location of an object as it appears in the two compared images. A recognized object in a test image may be determined to be a certain percentage away from an edge of the image relative to the width or height of the test image. An edge may be the left, right, top or bottom of an image. For example, an object may be determined to be 10% over from a left edge in a test image. By determination of the difference in the location of the object in the comparison image, as normalized, the determination of a disparity amount can yield an approximate depth value. For example, in the second image, an object may be 12% over from a left edge. The disparity may be used to determine a disparity of the region of interest or the object and based on distance and parallax angles of the image sensors a depth may be estimated for the object based on information in a calibration file for the dual camera system. For example, a disparity-to-distance curve may be part of calibration between two camera sensors used and may apply to the separation and angles between the two camera sensors. In an example embodiment, a correlation between percentages from edges and depth distances may be established within the calibration file. For example, a disparity difference of 2% may correlate to an approximate distance based on the calibration curve applied. Also, normalization of the pixels between to images based on pixel field size, field of view, or aspect ratios may be applied to the calibration before determination of approximate depths in an embodiment. In an aspect, ratio of pixels related to distance may exist as a normalization factor as between the images captured from the two camera types. In an example embodiment, a 1:3 ratio may exist between the test image from a base camera and the image captured from the second image sensor. The ratio of distance and the normalization factor of distance applied to the pixels for distance will depend on the two camera systems used. This ratio or normalization factor applied between the two types of images would be part of the calibration data.

In yet another embodiment, the information handling system can use any other known method to assign distances to regions of interest in a 3-D image, such as sonar, radar, or the like, without varying from the scope of this disclosure. In an embodiment, the calibration file can be generated by acquiring multiple images of an object at multiple distances and angles to the cameras 140 and 150. The calibration file can then model the relative offsets and transforms between the images at multiple distances, and once this relationship is understood, compute a physical dimension from a certain offset of pixels or superpixels between the images.

As shown in FIG. 2, in a further embodiment, an information handling system may first capture a test image from either the standard RGB camera or the second digital camera, whichever has a shorter capture distance or smaller field of view, as shown in block 250, and detect an object within the test image, as shown in block 260. There is a need, when using dissimilar digital camera pairs to determine if an object is detectable by both digital cameras. For example, infrared cameras have different capture distances and fields of view than RGB cameras, and thus, some objects may be detectable by an RGB camera, but not by an infrared camera. This may also hold true for any other type of dissimilar digital camera pairs with differing capture distances or fields of view, such as a telephoto lens digital camera, a fish-eye digital camera, a wide-angle digital camera, a close-focus digital camera, a sheet of light triangulation camera, a structured light camera, a time-of-flight camera, an interferometry camera, a coded aperture camera, and/or an array camera. An embodiment may conserve power by only directing the camera having a longer capture distance or larger field of view to turn on and capture an image once it is confirmed the camera having the shorter capture distance or smaller field of view can detect an object in its capture distance or field of view, as shown in block 270.

Figure 5:
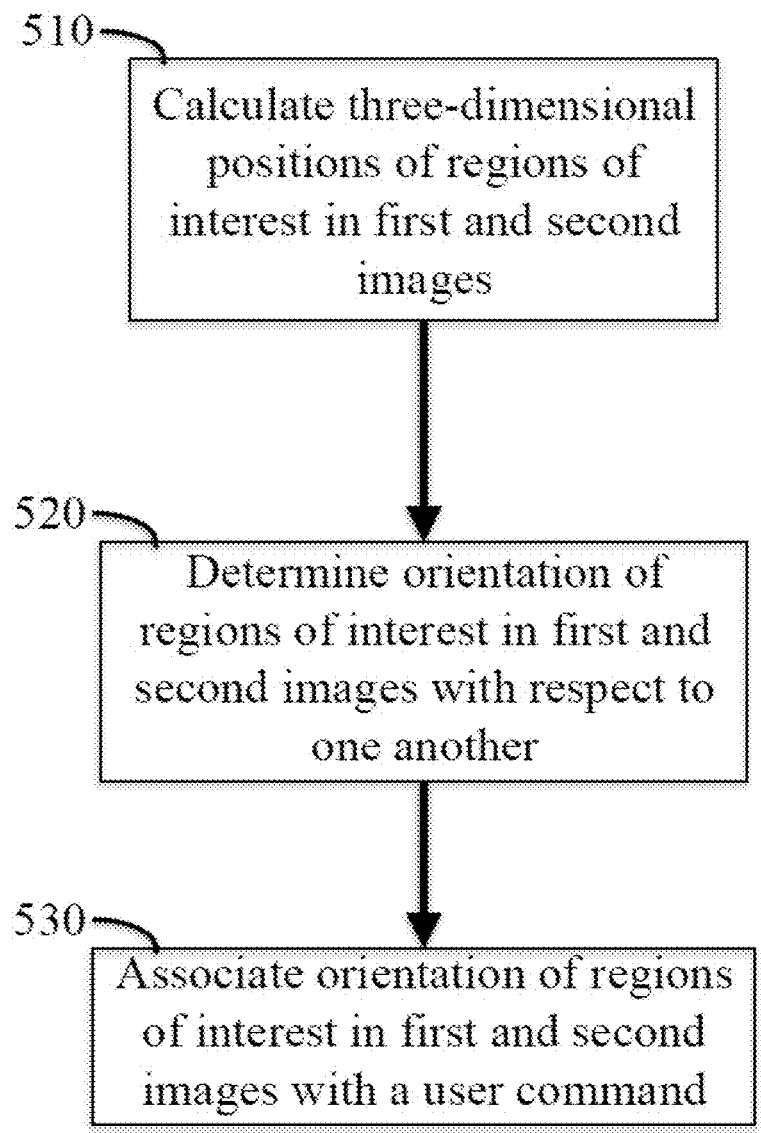
FIG. 5 is a flow diagram of a method for associating three dimensional locations of regions of interest with a user command according to a particular embodiment of the disclosure.

Referring back to FIG. 5, the information handling system in an embodiment also detects orientation of regions of interest in the first and second images with respect to one another. This involves recognizing the three-dimensional locations of each of the three-dimensional regions of interest with respect to one another. The information handling system may achieve this task by measuring the three-dimensional locations of each region of interest separately, as described above with respect to box 510, then comparing those three-dimensional locations to determine their physical three-dimensional orientations with respect to one another. As an example, referring back to FIG. 3 which shows an open palm, the orientation of the regions of interest with respect to one another indicate a certain distance between the thumb 320, tip of pinky finger 330, and base of wrist 340.

Figure 6:
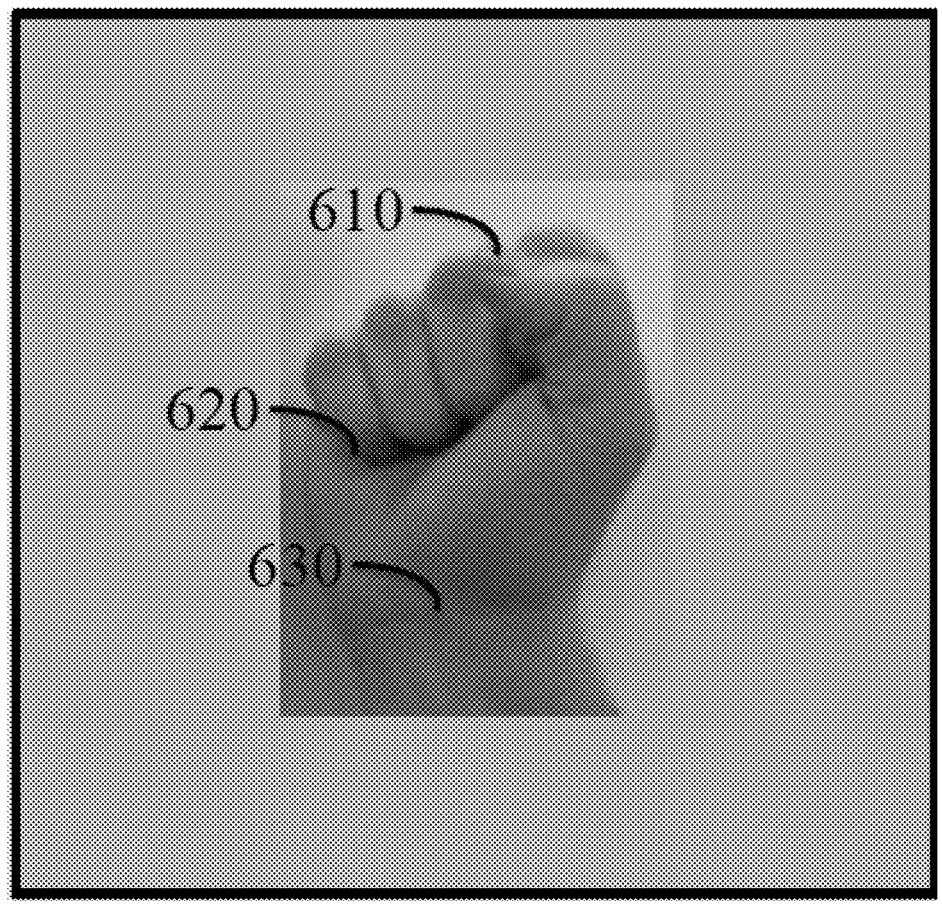
FIG. 6 is a diagram showing orientations of regions of interest for a hand in a first position according to a particular embodiment of the disclosure.

FIG. 6 is a diagram showing orientations of regions of interest for a hand in a first position. In FIG. 6, the information system handling measures the locations of regions of interest including the hand in a first and portions of the hand. The distances between the thumb 320, tip of pinky finger 330, and base of wrist 340 in FIG. 3 all have greater values than the distances between the thumb 610, tip of pinky finger 620, and wrist 630 in FIG. 6. In this way, the user interface in an embodiment can identify the orientation of the regions of interest within the hand as either far apart from one another (open palm), or closer to one another (closed fist).

Returning to FIG. 5, the information handling system in a preferred embodiment may associate orientation of regions of interest in the first and second images with a user command as shown in box 530. As discussed directly above, the information handling system may detect whether an image of a hand is either in an open palm orientation or in a closed first orientation. As an example, the information handling system could associate a closed first with a user command to select or grab an object on a user display. As a further example, the information handling system could associate an open hand with a user command to stop playback of an audio or video track.

Figure 7:
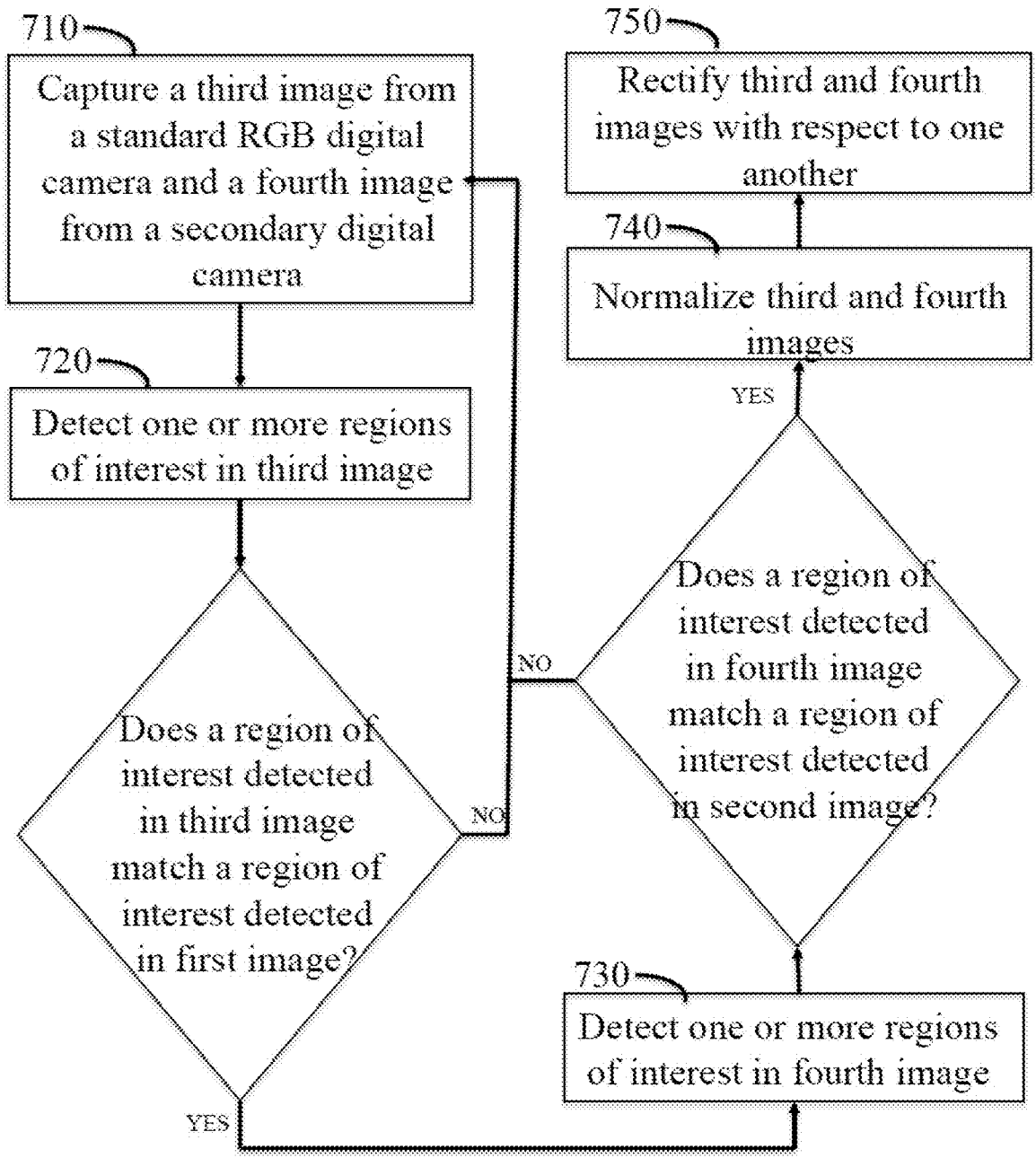
FIG. 7 is a flow diagram of a method for identifying regions of interest within a third and fourth image according to a particular embodiment of the disclosure.

FIG. 7 shows a flow diagram of a method for identifying regions of interest within a third and fourth image, wherein those regions of interest correspond to similar regions of interest taken in the above-mentioned first and second images. In another aspect of the embodiment, at block 710, the information handling system captures a third image from a RGB digital camera and a fourth image from a second digital camera. The third and fourth images may be captured contemporaneously and at a later point in time than the first and second images. At block 720, the information handling system may also detect one or more regions of interest within objects in the third image using sparse coding, as described above in reference to block 220 in FIG. 2. The information handling system may then determine whether any identified regions of interest in the third image correspond to similar regions of interest taken in the earlier captured first image. As an example, referring back to FIG. 3, the information handling system may identify a region of interest, for example an object such as a hand, in a first image, and also identify the region of interest such as the object in the later captured third image.

Referring back to FIG. 7, in an embodiment, if the regions of interest identified by the information handling system in the third image do not match or correlate with regions of interest in the first image, the information handling system repeats step 710. However, if the information handling system succeeds in identifying a region of interest in the third image which matches a region of interest in the first image, the information handling system may also detect one or more regions of interest within objects in the fourth image as shown in block 730 using sparse coding, as described above in reference to block 220 in FIG. 2.

The information handling system may also determine whether any identified regions of interest in the fourth image correspond to similar regions of interest taken in the earlier captured second image. As an example, referring to FIG. 3, the information handling system may identify the thumb 320 in a second image, and also identify a thumb 320 in the later captured fourth image.

Referring back to FIG. 7, in an embodiment, if the regions of interest identified by the information handling system in the fourth image do not match or correlate with regions of interest in the second image, the information handling system repeats step 710. However, if the information handling system succeeds in identifying a region of interest in the fourth image which matches a region of interest in the second image, the information handling system may normalize the third and fourth images, as shown in block 740 using the same method described above in reference to FIG. 2, block 240.

Referring back to FIG. 7, in block 780, in a further embodiment, an information handling system may rectify the third and fourth images with respect to each other using the same method described above in reference to FIG. 2, block 250.

Figure 8:
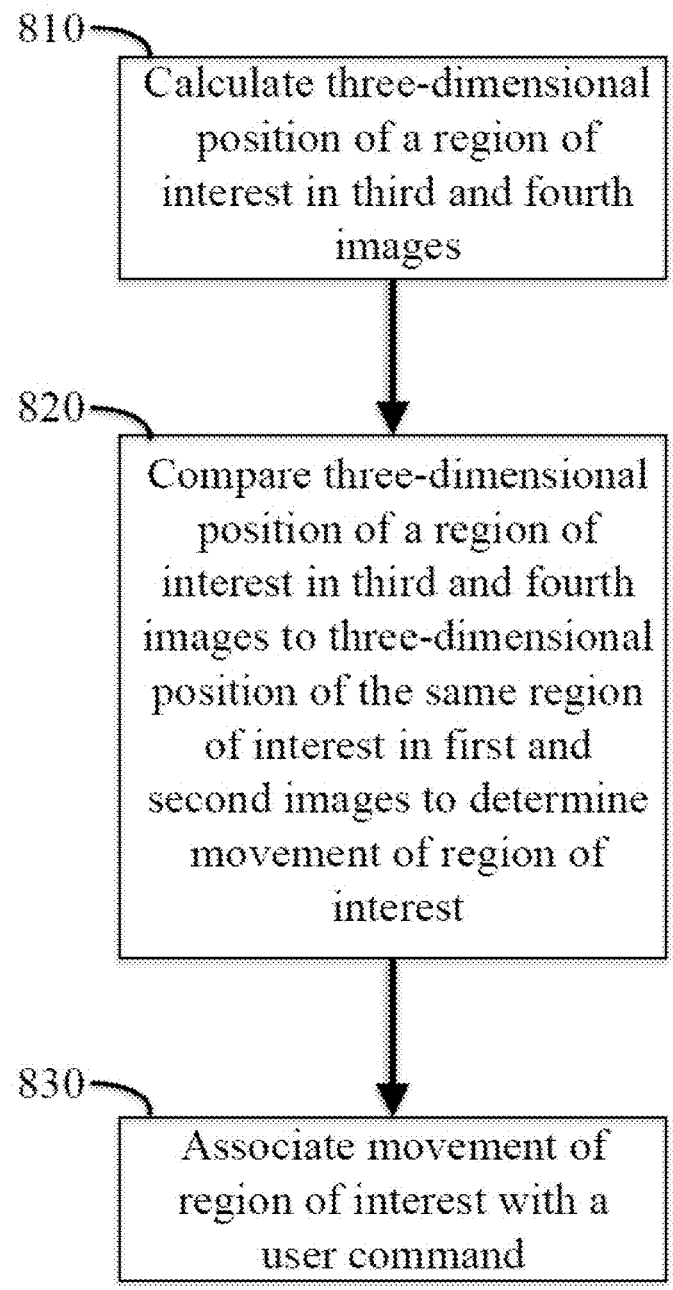
FIG. 8 is a flow diagram of a method for associating three dimensional movement of a region of interest with a user command according to a particular embodiment of the disclosure.

FIG. 8 shows a flow diagram of a method for associating three dimensional movement of a region of interest with a user command. At block 810, the information handling system in an embodiment may calculate a three-dimensional position of a region of interest located in the third and fourth images captured at blocks 710 using the parallax approach described above in reference to FIG. 5, block 510.

Referring back to FIG. 8, at block 820 the information handling system in an embodiment may also compare the three-dimensional position of a region of interest in the third and fourth images to the three-dimensional position of a correlating or matching region of interest in the first and second images to determine movement of the region of interest.

As is understood, motion detection of an object and movement including depth movement between captured images may be conducted via any number of techniques in addition to the one described above. For example, detection of motion of an object detected in the captured images by the dual camera systems may include particle filtering algorithms, camshift algorithm, condensation or icondensation algorithms that may apply to sequences of images and any other technique understood in the art.

Figure 9:
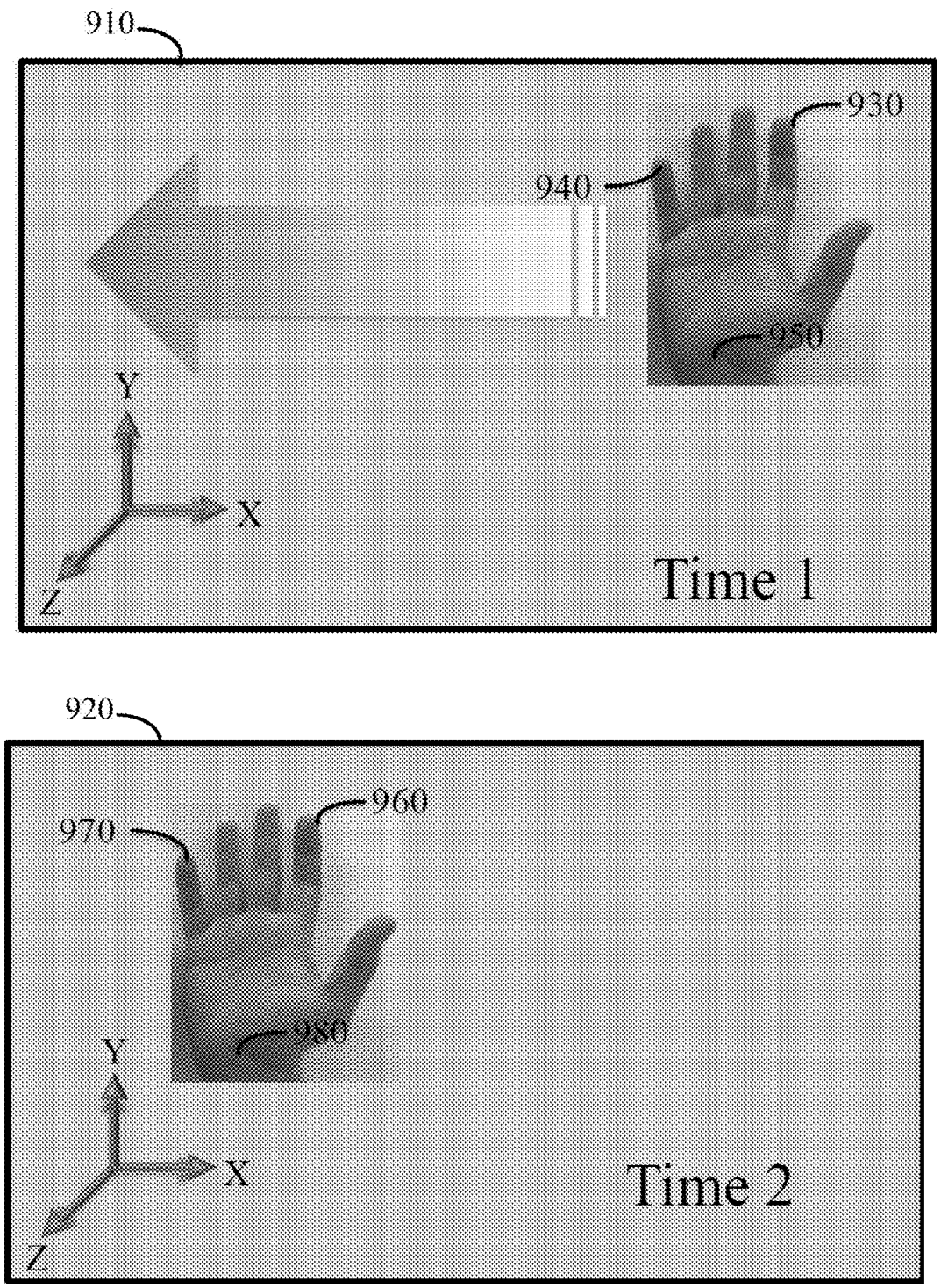
FIG. 9 is a three dimensional map showing the locations of the regions of interest identified in the first and second images and the locations of corresponding regions of interest identified in the later captured third and fourth images according to a particular embodiment of the disclosure.

FIG. 9 is a three dimensional map showing the locations of the regions of interest identified in the first and second images 910 and the locations of corresponding regions of interest identified in the later captured third and fourth images 920. As an example of determining movement of a region of interest as described in block 820, in an embodiment, the information handling system may map the locations of regions of interest in the first and second image correlating to a forefinger 930, a pinky finger 940, and a wrist 950, as shown in FIG. 9. The information handling system may also map the locations of regions of interest in the third and fourth images, taken at a later time, correlating to the same forefinger 960, the same pinky finger 970, and the same wrist 980. The information handling system may then compare the three-dimensional positions of these regions of interest in order to determine three-dimensional movement of each of these regions of interest. As an example, and as shown in FIG. 9, the information handling system may determine the change in position of the entire object such as a hand, or portions of the object such as a forefinger, pinky, and wrist to conclude the whole hand has moved from right to left.

Referring back to FIG. 8, the information handling system may associate three-dimensional movement of regions of interest with a user command. As an example, as shown in FIG. 9, the information handling system may associate the movement of the whole hand from right to left with a command to turn a page in a displayed document.

Figure 10:
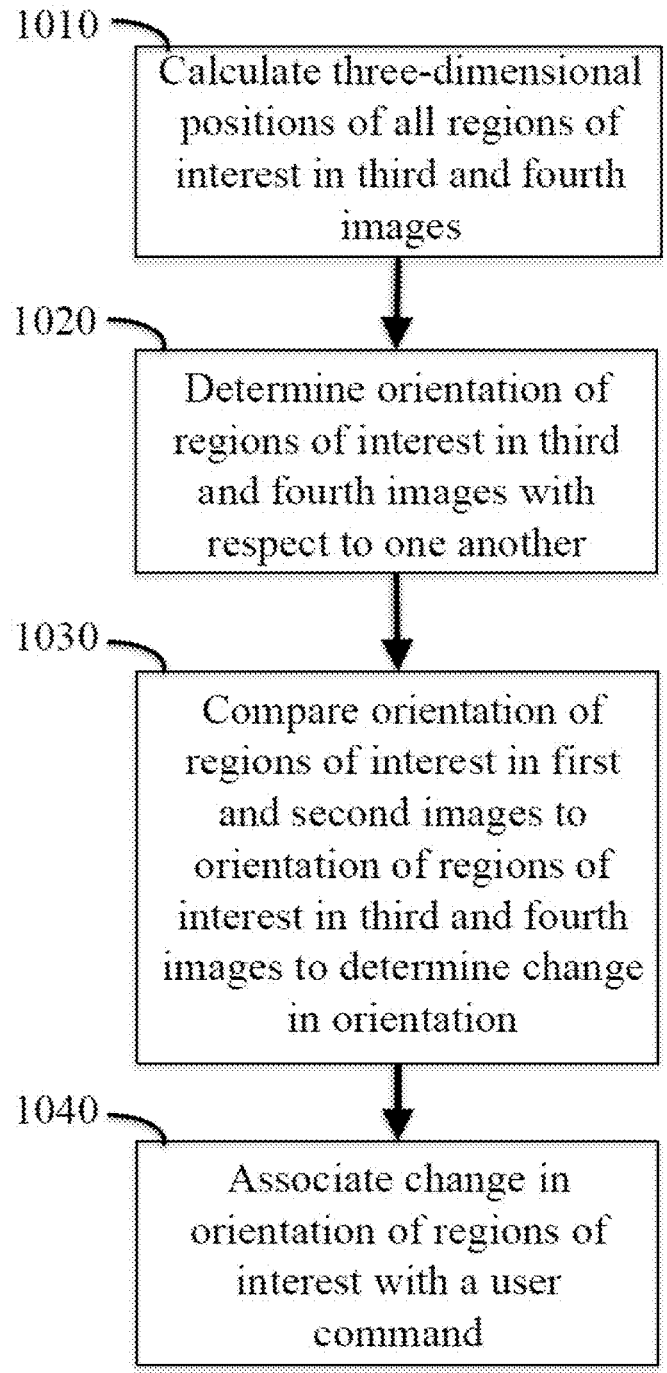
FIG. 10 is a flowchart diagram of a method for determining orientation of regions of interest in two different groups of images, identifying changes in orientation between those two groups of images, and associating any changes in orientation with a user command.

FIG. 10 is a flowchart diagram of a method for comparing three-dimensional positions of regions of interest captured in the first and second images, then captured again at a later time in the third and fourth images, determining orientation of those regions of interest in both groups of images, identifying changes in orientation between those two groups of images, and associating any changes in orientation with a user command. At block 1010, the information handling system may calculate three-dimensional positions of all regions of interest in the third and fourth image using the same parallax method described above in relation to FIG. 5, block 510. At block 1020, the information handling system in an embodiment may determine orientation of regions of interest in third and fourth images with respect to one another using the same methodology described above in reference to box 520, FIG. 5, and FIG. 6.

Referring back to FIG. 10, in an embodiment, the information handling system at block 1030 may compare orientation of regions of interest in the first and second images to orientation of regions of interest in the third and fourth images to determine a change in orientation.

Figure 11:
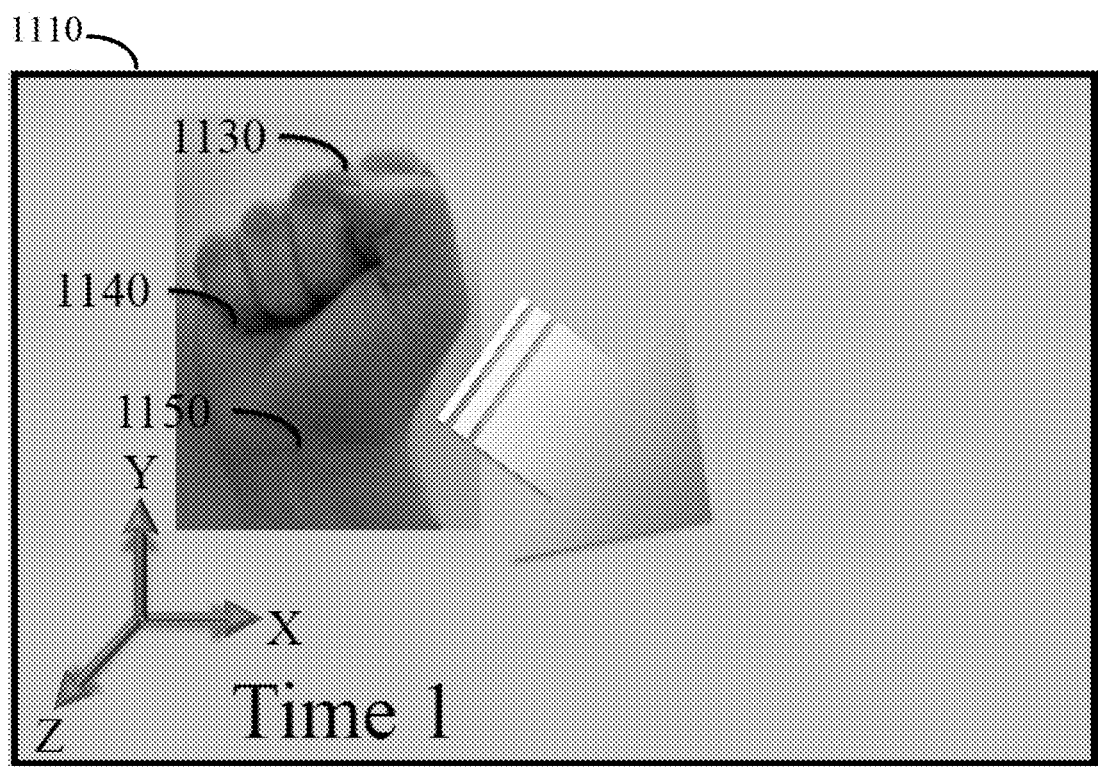
FIG. 11 is a three-dimensional map showing the positions of regions of interest in one group of images, and the positions of the same regions of interest in a later captured group of images.
Figure 11:
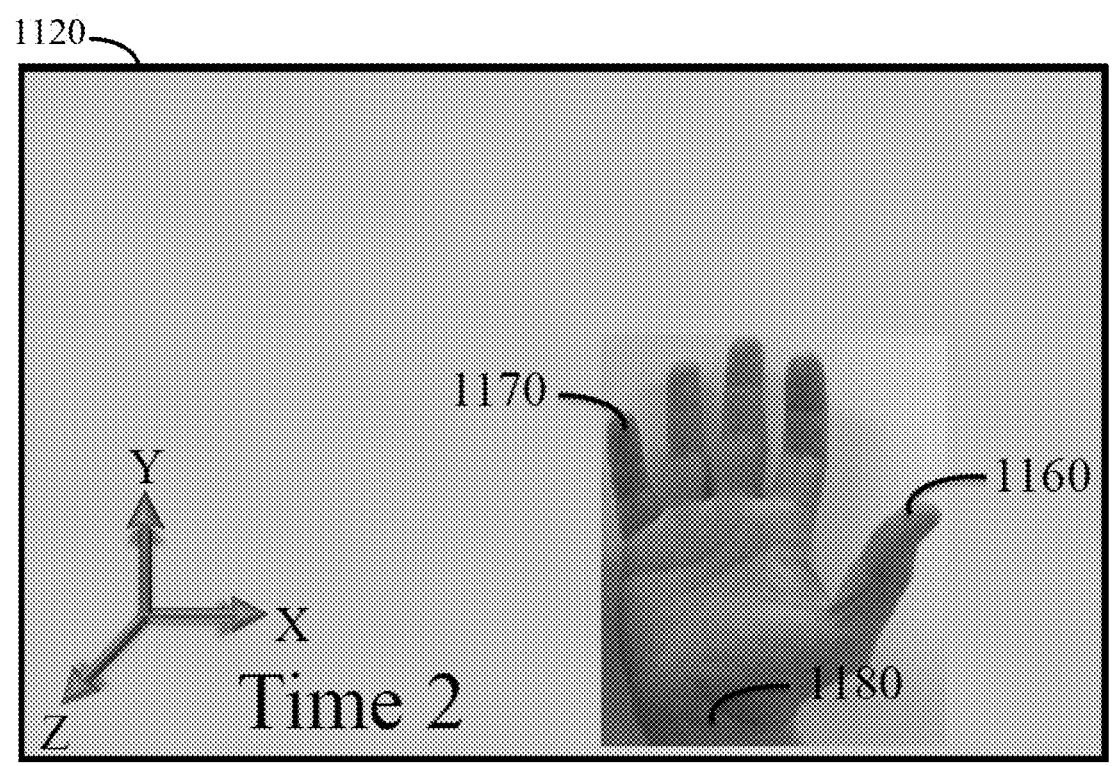

FIG. 11 is a three-dimensional map showing the positions of regions of interest in the first and second images 1110, and the positions of the same regions of interest in the third and fourth images 1120. As shown in FIG. 11, in the first and second images, the thumb has a position at 1130, the pinky has a position at 1140, and the wrist has a position at 1150. In contrast, in the third and fourth images, the thumb has a position at 1160, the pinky has a position at 1170, and the wrist has a position at 1180. The information handling system may associate the shorter distances between the regions of interest 1130-1150 with a closed fist, and may associate the longer distances between the regions of interest 1160-1180 as an open palm. In an embodiment, the information handling system may further determine the change in orientation from a closed first to an open palm between the time at which the first and second images were captured in comparison to the time at which the third and fourth images were captured.

Referring back to FIG. 10, at block 1040, the information handling system may associate changes in orientation of regions of interest with a user command. As an example, the information handling system may associate the change in orientation from a first to an open palm, as discussed directly above in relation to FIG. 11 with stopping playback of an audio or video track or with selecting and deselecting an object. In another aspect of the embodiment, an information handling system may associate the combination of the movement of the hand discussed above with reference to FIG. 9 and the change in orientation of the hand from a first to an open palm as discussed above with reference to FIG. 11 with the command of selecting an item by forming a fist, dragging that item to a new location by moving the whole hand, and dropping that item in a new location by releasing the first into an open palm. The association of other gesture commands are contemplated as well, as known or contemplated in the art.

The blocks of the flow diagrams discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system comprising:
   a first digital camera that is an RGB digital camera to capture a first image;
   a second digital camera to contemporaneously capture a second image;
   a processor operatively coupled to the first digital camera and the second digital camera;
   the processor executing code instructions of a gross-level input detection system to detect at least one object in each of the first image and the second image using object detection techniques and to normalize the first image and the second image in comparison to one another with respect to differences in horizontal and vertical pixel coordinate locations between first digital camera parameters and second digital camera parameters reflected in the first image and the second image;
   the processor executing code instructions of a gross-level input detection system to further identify a region of interest within the at least one object in each of the first image and the second image and calculate a gross-level three-dimensional position of the region of interest within the at least one object in each of the first image and the second image by comparing differences between normalized pixel coordinates of the region of interest within the at least one object in each of the first image and the second image to determine orientation and position of the region of interest of the at least one object; and
   the processor to receive a user input command for execution on the information handling system determined from the orientation and position of the region of interest of the detected at least one object.

2. The information handling system of claim 1 further comprising:
   the processor to receive the user input command for execution on the information handling system determined from a change in the orientation and position of the region of interest of the detected at least one object from a previous determination a gross-level three-dimensional position of the region of interest within the at least one object.

3. The information handling system of claim 1 further comprising:
the first digital camera to capture a third image at a later time;
the second digital camera to capture a fourth image at a later time, contemporaneously with the capture of the third image;
the processor executing code instructions of the gross-level input detection system to detect at least one object in each of the third image and the fourth image using object detection techniques and to normalize the third image and the fourth image with respect to differences in horizontal and vertical pixel coordinate locations between first digital camera and second digital camera parameters reflected in the third image and the fourth image;
the processor executing code instructions of a gross-level input detection system to further identify a region of interest within the at least one object in each of the third image and the fourth image and calculate a gross-level three-dimensional position of the region of interest within the at least one object in each of the third image and the fourth image by comparing differences between normalized pixel coordinates of the region of interest within the object in each of the third image and the fourth image; and
the processor executing code instructions of a gross-level input detection system to detect and associate a difference between the gross-level three-dimensional position of the region of interest within the at least one object in each of the third image and the fourth image and the gross-level three-dimensional position of the region of interest within the at least one object in each of the first image and the second image with at least one user command.

4. The information handling system of claim 1, wherein the second digital camera is also an RGB digital camera.

5. The information handling system of claim 1, wherein the second digital camera is a non-standard digital camera selected from an infrared digital camera, a telephoto lens digital camera, a fish-eye digital camera, a wide-angle digital camera, a close-focus digital camera, a three-dimensional camera including a stereo triangulation camera, a sheet of light triangulation camera, a structured light camera, a time-of-flight camera, an interferometry camera, a coded aperture camera, an array camera, or any other type of non-standard digital camera known in the art.

6. The information handling system of claim 4, wherein the processor to additionally rectify the first image and the second image before calculating the gross-level three-dimensional position of the region of interest within the at least one object in each of the first image and the second image.

7. The information handling system of claim 1, wherein the second digital camera is an infrared camera.

8. The information handling system of claim 4, wherein the processor directs the non-standard digital camera to capture a preliminary image, the processor executing code instructions of a gross-level input detection system to detect at least one object in the preliminary image using sparse coding object detection techniques, and, in response to the processor successfully detecting at least one object in the preliminary image, to direct the RGB digital camera to capture the first image.

9. A computer implemented method comprising:
directing at least one RGB digital camera to capture a first image;
directing at least one second digital camera to contemporaneously capture a second image;
detecting at least one object in each of the first image and the second image using object detection techniques;
normalizing, via a processor executing code instructions of a gross-level input detection system, the first image and the second image in comparison to one another with respect to differences in horizontal and vertical pixel coordinate locations between RGB camera parameters and second digital camera parameters reflected in the first image and the second image;
identifying a region of interest within the at least one object in each of the first image and the second image;
calculating a gross-level three-dimensional position of the region of interest within the at least one object in each of the first image and the second image by comparing differences between normalized pixel coordinates of the region of interest within the at least one object in each of the first image and the second image to determine orientation and position of the region of interest of the at least one object for assessment as a potential user command; and
associating the determined orientation and position of the region of interest of the at least one object in each of the first image and the second image with at least one user command.

10. The computer implemented method of claim 9 further comprising:
associating movement of the determined orientation and position of the region of interest of the at least one object in each of the first image and the second image from a previously determined orientation and position of the region of interest of the at least one object with at least one user command.

11. The computer implemented method of claim 9 further comprising:
identifying a plurality of regions of interest within the at least one object in each of the first image and the second image;
detecting the orientation of each of the plurality of regions of interest within the at least one object in each of the first image and the second image with respect to one another; and
associating the orientation of each of the plurality of regions of interest within the at least one object in each of the first image and the second image with at least one user command.

12. The computer implemented method of claim 9 further comprising:
directing the at least one RGB camera to capture a third image at a later time than the capture of the first image;
directing the at least one second digital camera to capture a fourth image contemporaneously with the capture of the third image;
detecting at least one object in each of the third image and the fourth image using object detection techniques;
normalizing the third image and the fourth image in comparison to one another;
identifying a region of interest within the at least one object in each of the third image and the fourth image and calculating a gross-level three-dimensional position of the region of interest within the at least one object in each of the third image and the fourth image by comparing differences between normalized pixel coordinates of the region of interest within the object in each of the third image and the fourth image;

detecting a difference between the gross-level three-dimensional position of the region of interest within the at least one object of each of the third image and the fourth image and the gross-level three-dimensional position of the region of interest within the at least one object in each of the first image and the second image; and associating the difference between the gross-level three-dimensional position of the region of interest within the at least one object in each of the third image and the fourth image and the gross-level three-dimensional position of the region of interest within the at least one object in each of the first image and the second image with at least one user command.

13. The computer implemented method of claim 9, wherein the second digital camera is a non-standard digital camera selected from a telephoto lens digital camera, a fish-eye digital camera, a wide-angle digital camera, a close-focus digital camera, a three-dimensional camera including a stereo triangulation camera, a sheet of light triangulation camera, a structured light camera, a time-of-flight camera, an interferometry camera, a coded aperture camera, or an array camera.

14. The computer implemented method of claim 9, further comprising rectifying the first image and the second image before calculating the gross-level three-dimensional position of the region of interest within the at least one object in each of the first image and the second image.

15. The computer implemented method of claim 9, wherein the second digital camera is an infrared camera.

16. The computer implemented method of claim 9, further comprising:

directing the second digital camera that is a non-standard digital camera to capture a preliminary non-standard image before the capture of the first image;

detecting at least one object in the preliminary non-standard image using sparse coding techniques before the capture of the first image; and directing the RGB digital camera to capture the first image only if the processor successfully detects at least one object in the preliminary non-standard image.

17. An information handling system comprising:

a first digital camera that is an RGB digital camera to capture a first image;

a second digital camera to contemporaneously capture a second image;

a processor operatively coupled to the first digital camera and the second digital camera;

the processor executing code instructions of a gross-level input detection system to detect at least one object in each of the first image and the second image using object detection techniques and to normalize the first image and the second image in comparison to one another;

the processor executing code instructions of a gross-level input detection system to identify a plurality of regions of interest within the at least one object in each of the first image and the second image and calculate a gross-level three-dimensional position of each of the plurality of regions of interest within the at least one object in each of the first image and the second image by comparing differences between normalized pixel coordinates of each of the plurality of regions of interest within the at least one object in each of the first image and the second image;

the processor to additionally detect the orientation of each of the plurality of regions of interest within the at least one object in each of the first image and the second image with respect to one another for assessment as a potential user command;

the gross-level input detection system associating the orientation with respect to one another of each of the plurality of regions of interest within the at least one object in each of the first image and the second image with at least one user command; and the processor to receive a user input command for execution on the information handling system determined from the orientation and position of the region of interest of the detected at least one object.

18. The information handling system of claim 17, further comprising:

the processor to receive a user input command for execution on the information handling system determined from tracked changes for movement of the orientation and position of the region of interest of the detected at least one object.

19. The information handling system of claim 17, further comprising:

the first digital camera to capture a third image at a later time;

the second digital camera to capture a fourth image at a later time, contemporaneously with the capture of the third image;

the processor executing code instructions of a gross-level input detection system to detect at least one object in each of the third image and the fourth image using object detection techniques and to normalize the third image and the fourth image in comparison to one another;

the processor executing code instructions of a gross-level input detection system to identify a plurality of regions of interest within the at least one object in each of the third image and the fourth image and calculate a gross-level three-dimensional position and orientation of each of the plurality of regions of interest within the at least one object in each of the third image and the fourth image by comparing differences between normalized pixel coordinates of each of the plurality of regions of interest within the at least one object in each of the third image and the fourth image;

the processor executing code instructions of a gross-level input detection system to detect a difference between the position or orientation of each of the plurality of regions of interest within the at least one object in each of the third image and the fourth image with respect to one another and the position or orientation of each of the plurality of regions of interest within the at least one object in each of the first image and the second image with respect to one another; and the processor executing code instructions of a gross-level input detection system to associate the difference between the position or orientation of each of the plurality of regions of interest within the at least one object in each of the third image and the fourth image with respect to one another and the orientation of each of the plurality of regions of interest within the at least one object in each of the first image and the second image with respect to one another with at least one user command.

20. The information handling system of claim 17, wherein the second digital camera is a non-standard digital camera selected from an infrared digital camera, a telephoto lens digital camera, a fish-eye digital camera, a wide-angle digital camera, a close-focus digital camera, a three-dimensional camera including a stereo triangulation camera, a sheet of light triangulation camera, a structured light camera, a time-of-flight camera, an interferometry camera, a coded aperture camera, an array camera or any other type of non-standard digital camera known in the art.

* * * * *